United States Patent [19]

Kaminsky

[11] Patent Number: 5,778,317
[45] Date of Patent: Jul. 7, 1998

[54] METHOD FOR ALLOCATING CHANNELS IN A RADIO NETWORK USING A GENETIC ALGORITHM

[75] Inventor: Alan Richard Kaminsky, Rochester, N.Y.

[73] Assignee: Harris Corporation, Melbourne, Fla.

[21] Appl. No.: 645,098

[22] Filed: May 13, 1996

[51] Int. Cl.⁶ .................................................. H04Q 7/20
[52] U.S. Cl. ................................... 455/450; 455/447
[58] Field of Search .......................... 455/33.1, 34.2, 455/34.1, 54.1, 56.1, 62, 63, 67.1, 450, 451, 452, 517, 524, 446, 447, 448, 449

[56] References Cited

U.S. PATENT DOCUMENTS

| | | |
|---|---|---|
| 4,935,877 | 6/1990 | Koza . |
| 5,038,399 | 8/1991 | Bruckert ................................. 455/62 |
| 5,245,696 | 9/1993 | Stork et al. . |
| 5,293,640 | 3/1994 | Gunmar et al. . |
| 5,355,367 | 10/1994 | Comroe et al. ...................... 455/447 |
| 5,390,283 | 2/1995 | Eshelman et al. . |
| 5,394,509 | 2/1995 | Winston . |
| 5,404,574 | 4/1995 | Benveniste . |
| 5,428,815 | 6/1995 | Grube ................................... 455/452 |
| 5,557,639 | 9/1996 | Heikkila et al. . |

*Primary Examiner*—Nguyen Vo
*Assistant Examiner*—Gertrude Arthur
*Attorney, Agent, or Firm*—Rogers & Killeen

[57] ABSTRACT

A method of allocating radio channels among tactical networks of radio transceivers which uses fuzzy logic to evaluate quality of communication and which uses a genetic algorithm to find an optimal channel allocation plan. The method generates plural plans which each have a random allocation of the radio channels to the networks, and evaluates each plan to provide a goodness vector for each of the plans. The goodness vector is a vector of goodness values which are continuous from best to worst. The process iteratively ranks the evaluated plans based on their goodness vectors, uses higher ranked plans to generate further plans which are also ranked, and deletes lower ranked plans until the top ranked plan or the goodness vector does not change for a predetermined period. The channels are allocated in accordance with the top ranked plan.

24 Claims, 4 Drawing Sheets

METHOD FOR ALLOCATING CHANNELS IN A RADIO NETWORK USING A GENETIC ALGORITHM

BACKGROUND OF THE INVENTION

The present invention relates to radio communication plans, and more particularly to a method of allocating plural channels among networks of radio transceivers.

Radio networks, especially those used by the military, include plural transceivers which communicate over several communication channels, each with its own frequency band. In the event there are plural radio networks which operate in the same region with a limited number of channels, a communication plan is developed which allocates the channels among the networks so that each network has its desired number of channels (or nearly so) and which avoids interference among the networks. A communication plan may consist of lists of channels for each network (e.g., channels 1, 4, 5, and 10 are allocated to network A and channels 2, 3 and 8 are allocated to network B.)

It is desirable that the communication plan makes a high quality of communication available to each network, and that the overall quality of communication afforded by the plan be optimal. An evaluation of quality of communication may be based on a number of factors of varying importance to each network. Factors which may be considered in evaluating quality of communication include propagation losses, number of channels, channel reuse, frequency range, and co-location interference. Other factors may also be considered, as deemed appropriate for a particular application.

Propagation losses are desirably small for some or all of the channels allocated to each of the networks. Certain frequencies propagate better than others at various times of day and over various distances. The number of channels allocated will vary, and allocation of too few or too many channels may degrade overall communication quality. Channels may be used by more than one network, albeit with loss of quality. Communication may be degraded if the range of frequencies allocated to a channel list is too great. For example, a network with frequency hopping transceivers may require that all of the frequencies in the hop list lie within a band 2 MHz wide.

For a small number of channels and networks, a hand-developed channel allocation plan can take these factors into account. However, when the number of channels and networks increases, the combinatorial optimization problem can be overwhelming. For example, with 10 networks and 20 channels to be allocated, there are more than $10^{60}$ possible allocation plans.

This number of plans cannot be reasonably evaluated with any presently available computer. Even though the number of possible allocation arrangements is finite, it is "vast" so that all possible arrangements cannot be evaluated in a reasonable period, no matter how fast the computer. For an example of a vast number, consider that if one had a library of books which contain all possible arrangements of 100 standard characters (letters, numbers, punctuation, spaces, etc.), and each book has one million of the characters, the library would contain everything that has ever been or will be written (including this application). The number of books in the library would be determinable (all possible combinations of 100 characters in one million character sets) but the number of books would be so vast that it is unlikely that one would ever find even a single book that made sense.

The present invention recognizes that all allocation plans cannot be evaluated, and relies on a process based on a genetic algorithm to find a reasonably optimal plan. Genetic algorithms are known and use an iterative refinement technique which evaluates whether one solution is better than another. Further information about genetic algorithms is available in *Handbook of Genetic Algorithms*, Lawrence Davis, Van Nostrand Reinhold, 1991.

The present invention also recognizes that conventional Boolean logic which presents only two possible truths (zero or one) cannot effectively treat the myriad of possible truths which are encountered in evaluating a radio channel allocation plan. Instead, the present invention relies on fuzzy logic which provides a continuum of truths from zero (false) to one (true). Further information about fuzzy logic is available in *Neural Networks and Fuzzy Systems: A Dynamical Systems Approach to Machine Intelligence*, Bart Kosko, Prentice-Hall, 1992.

Neither fuzzy logic nor genetic algorithms have been used to allocate channels among radio networks. One known channel allocation method relies on linear programming, and is not adaptable to tactical radio networks with overlapping regions of use. See, U.S. Pat. No. 5,404,574 to Benveniste. Another method relies on a Monte Carlo technique, thus not taking advantage of the "survival of the fittest" methodology of genetic algorithms. See, PCT Application PCT/SE90/00119 filed by Televerket (Gunmar, inventor).

Accordingly, it is an object of the present invention to provide a novel method for allocating radio channels among plural networks which relies on a combination of a genetic algorithm and fuzzy logic to obviate the problems of the prior art.

It is an additional object of the present invention to provide a novel method for allocating radio channels among plural networks where the number of possible allocation plans is vast (a finite number which is too large for each plan to be evaluated).

It is another object of the present invention to provide a novel method for allocating radio channels among plural networks in which plural plans with random allocation of the radio channels to the networks are each evaluated to provide a goodness vector for each of the plans, and in which the vector comprises values which are continuous scale from best to worst.

It is yet another object of the present invention to provide a novel method for allocating radio channels among plural networks in which evaluated plans are ranked from best to worst based on their goodness vectors, in which higher ranked plans are manipulated to generate further plans which are also ranked, in which lower ranked plans are deleted, and in which this sequence is repeated until the top ranked plan or the goodness vector does not change for a predetermined period.

It is still another object of the present invention to provide a novel method for allocating radio channels among plural networks in which the evaluation of the plans considers one or more goodness factors, and in which the evaluation of the factors provides a rating which varies in a continuum from best to worst.

It is a further object of the present invention to provide a novel method for allocating radio channels among plural networks in which higher ranked plans are manipulated to generate further plans by using a probability distribution function which favors higher ranked plans and selecting either one or two of the plans which can be probabilistically combined or mutated to form a new plan.

It is an additional object of the present invention to provide a novel method for planning allocation of channelized resources among networks of the resources, in which plural plans for allocating the resources to the networks are randomly generated, each of the plural plans is evaluated to provide a goodness vector for each of the plans which has values from a scale which is continuous from best to worst, in which the evaluated plans are ranked from best to worst based on the goodness vector, and higher ranked plans are used to generate further plans which are also ranked until the quality indicator for the top ranked one of the plans does not change for a predetermined period.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

The present invention relates to a method for planning allocation of channelized resources among networks of the resources. Plural plans for allocating the resources to the networks are randomly generated, each of the plural plans is evaluated to provide a goodness vector for each of the plans and the evaluated plans are ranked from best to worst based on the goodness vector. Higher ranked plans are used to generate further plans which are also ranked until the top ranked one of the plans does not change for a predetermined period.

An embodiment of the method of the present invention is for allocating radio channels among networks of radio transceivers and may include the generation of plural plans for allocating the radio channels to the networks where each of the plural plans has a random allocation of the radio channels to the networks. The number of plans which are randomly generated may vary depending on the computational ability of the computer being used. Each of the plural plans may then be evaluated based on one or more goodness factors, where the goodness factors are measured on a scale which is continuous from good to bad. Each of the goodness factors considers a communication quality indicator (and an optional multipath quality indicator) which is generated for each channel allocated under the plan. The goodness factors form a goodness vector for each plan. The ranked weighted sum (or similar representation) of the values in the goodness vectors may be used to compare the plans and rank them from best to worst. Further plans may then be added which are manipulated versions of higher ranked ones of the plural plans, until a predetermined number of further plural plans have been added (e.g., a ten percent increase.) All of the plural plans, now including the further plans, may then be reevaluated and reranked to provide a new rank ordered set of plans. The lower ranked ones of the plural plans may then be deleted until the original number of plans remain. This entire process may then be repeated until the identity of the top ranked plan and/or the goodness vector of the top ranked one of the plans does not change for a predetermined period which may be a time or a number of iterations. At this point, the top ranked plan is reasonably optimal, and the channels may be allocated in accordance with the top ranked plan.

The steps of the method will be described generally, and then in more detail by providing an example.

The step of generating the plural plans may include the random generation of lists of plural channels for each of the networks to use. Each list of plural channels may be a vector of zeros and ones which indicates whether each of the channels is for use by the network (e.g., a one indicates the channel is assigned to the network.)

To evaluate each of the plans, a communication quality indicator (CQI) may be determined for each channel allocated in each plan. CQI is an attribute of a channel in a particular network (the randomly allocated network of channels being evaluated.) A CQI is a fuzzy quantity (not Boolean) which indicates how true is the statement, the reliability of the signal-to-noise ratio (SNR) for the channel is greater than or equal to the required reliability. For example, a network may require a SNR of 7 dB with a reliability of 90%. If the channel's predicted reliability is greater than or equal to the network's required reliability, the CQI is 1.0. To the extent that the channel's predicted reliability is less than the network's required reliability, the CQI is less than 1.0.

The plans may also be evaluated with a multipath quality indicator (MQI) which also is a fuzzy quantity which indicates how true is the statement, the channel's multipath probability is less than or equal to the tolerated multipath probability. For example, a network may require that the probability of having two or more propagation paths within 10 dB and 6 milliseconds of each other must 10% or less. If the channel's predicted multipath probability is less than or equal to the network's tolerated multipath probability, the MQI is 1.0. To the extent that the channel's predicted multipath probability is greater than the network's tolerated multipath probability, the MQI is less than 1.0.

The CQI (and optional MQI) may be used to evaluate various goodness factors related to communication quality, such as best-channels communication quality and average communication quality. Additional goodness factors may also be evaluated, such as channel count maximized, channel count minimized, frequency spread in range, frequency spread maximized, frequency spread uniformity, delay spread, inter-network spectrum reuse, and collocation interference. Other goodness factors may be used in addition to or instead of these as appropriate. Each of the goodness factors considered may be expressed as a goodness value which may be provided from a continuum between best and worst (typically zero would be worst and one would be best.) In a preferred embodiment, the CQI is used to evaluate all the communication quality goodness factors, and the MQI may be used as an optional further evaluation tool, although the invention is not so limited and the MQI may be the primary indicator and the CQI may be optional.

The goodness factors may have varying degrees of importance, depending on the purpose of the communication network or the phase of operation. To this end, goodness factors may be ranked and weighted. For example, three goodness factors may be most important and ranked highest, and further goodness factors may be ranked lower. Within each ranking, the goodness factors may be weighted.

The step of ranking the plans may include the step of determining the sum of the weighted factors of a rank of goodness values, and comparing the rank weighted sum to corresponding values from other plans. That is, the weighted goodness values for the top ranked goodness factors may combined to provide a single value which can be compared. Ties may be resolved by similarly evaluating the next lower ranked goodness factors.

The step of adding further plans may include the manipulation of existing plans by selecting either one or two of the plans from among the higher ranked plans which can be probabilistically combined or mutated to form a new plan. Two of the plans may be selected using a probability distribution function which favors higher ranked plans, and the two selected plans may be copied and the copies combined to form a new plan which is added to the existing plans (the two selected plans may be retained.) Alternatively, one of the higher ranked plans may be selected, copied and the copy mutated to form a new plan. The combinations and mutations may be randomly made using selected probability distribution functions.

After a predetermined number of new plans have been added, all of the original and new plans may be reevaluated, and the plans reranked. Lower ranked plans may then be deleted ("survival of the fittest") to retain the original number of plans. Since high ranked plans are the seeds for the new plans, better plans may be expected to develop over numerous iterations, and to this end the process may be repeated until no significant further improvements are observed.

The present invention may be further understood with reference to the example of a preferred embodiment below in which the steps for finding an optimal allocation plan are set forth, followed by several examples of goodness factor determination.

1. Create $N_p$ random channel allocations to form the initial population of plural plans. $N_p$ may be a number selected as appropriate for the processing system being used, although typically may be less than about a thousand (from among a vast number of possible plans.) A channel allocation is a vector of 0s and is, indexed by channel. An element of the vector is 1 if the corresponding channel is allocated to the corresponding channel list. For example, in a plan for the allocation of channels 1–10 to networks A and B the initially generated random vectors may be:

| Ch.   | 1 | 2 | 3 | 4 | 5 | 6 | 7 | 8 | 9 | 10 |
|-------|---|---|---|---|---|---|---|---|---|----|
| Net A | 0 | 0 | 1 | 0 | 1 | 0 | 0 | 0 | 1 | 0  |
| Net B | 1 | 0 | 0 | 0 | 1 | 0 | 0 | 1 | 0 | 1  |

In this example, channels 3, 5, and 9 are allocated to network A and channels 1, 5, 8, and 10 are allocated to network B. To create a random channel allocation, a biased coin may be used where the probability of heads is $P_l$. The probability of heads may be determined from:

$$P_l = \frac{\text{Sum of the number of channels desired for all networks}}{\text{Number of networks} \times \text{Number of available channels}}$$

This formula makes $P_l$ equal to the fraction of the entries in all of the vectors that are desired to have a value of one (indicating a channel allocation in this example.) If the coin flip is heads for a particular network/channel entry in the vector, the entry is one, and if the coin flip is tails, the entry is zero.

2. For each channel allocation plan, compute each channel's CQI. The CQIs may be in an array which indicates the CQI for each communication path P for each hour H of the day, that is, each channel C for each allocated network N has CQI entries by P and H.

Figure 1:
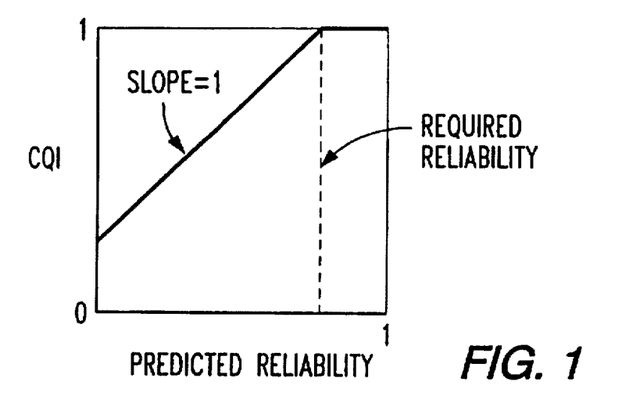
FIG. 1 is a graph depicting an embodiment of a relationship between predicted reliability of communication and the communication quality indicator which may be used in the method of the present invention.

The determination of CQI may consider both skywaves and groundwaves which are evaluated using conventional propagation prediction models or historical database. For example, skywave propagation may use IONCAP, VOACAP, ICEPAC and the like to provide predicted reliability values (VOACAP is presently preferred). Groundwave prediction may use the Longley-Rice Model, QKAREA and the like to provide predicted reliability values (Longley-Rice is presently preferred). The determination of CQI may evaluate propagation along a set of representative communications paths, denoted evaluation paths. Predicted reliability values may be provided for each hour H of the day and for each evaluation path P. The predicted reliability values may be converted to CQI values using the desired propagation characteristics (for example, as mentioned above, a network may require a SNR of 7 dB with a reliability of 90%). An exemplary graph depicting the relationship between CQI and predicted reliability is depicted in FIG. 1. For each array entry the skywave (sw) and groundwave (gw) values may be compared and a value selected, preferably the maximum. Thus, each channel C in each network N would have an array of CQIs which are determined by $(H,P)_{C,N} = CQI_{sw} \vee CQI_{gw}$, where the fuzzy "or" symbol $\vee$ is defined to be their maximum.

Figure 2:
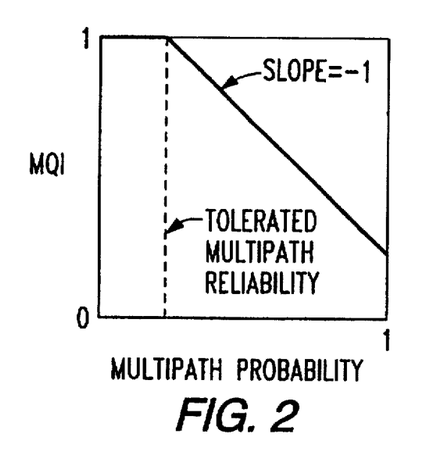
FIG. 2 is a graph depicting an embodiment of a relationship between probability of multipath and the multipath quality indicator which may be used in the method of the present invention.

If MQI is to be used, it may be similarly determined. The determination of MQI may consider both skywave only multipath and skywave-groundwave multipath which are evaluated using conventional propagation prediction models. For example, skywave propagation may use IONCAP, VOACAP, ICEPAC and the like to provide predicted multipath probabilities (VOACAP is presently preferred). Groundwave prediction may use the Longley-Rice Model, QKAREA and the like to provide predicted multipath probabilities (Longley-Rice is presently preferred). Predicted multipath probabilities may be provided for each hour H of the day and for each evaluation path P. The predicted multipath probabilities may be converted to MQI values using the desired propagation characteristics. An exemplary graph depicting the relationship between MQI and predicted reliability is depicted in FIG. 2. For each array entry the skywave only multipath (sw) and skywave-groundwave multipath (sw-gw) values may be compared and a value selected, preferably the maximum.

3. Select the appropriate goodness factors which are to be used, determine the goodness values based on the CQI (and MQI) and assemble the goodness values in a goodness vector $G_i$, $1 \leq i \leq n$, where n is the number of goodness factors considered and where each $G_i$ is a fuzzy quantity: $0 < G_i \leq 1.0$. The determination of exemplary goodness values is discussed below. The goodness values in the goodness vectors are numbers in the range 0.00 to 1.00 inclusive giving the degree to which the corresponding goodness factor is true. The set of goodness factors used is tailored to the problem being solved, and may include for example best-channels communication quality, average communication quality, channel count maximized, channel count minimized, frequency spread in range, frequency spread maximized, frequency spread uniformity, delay spread, inter-network spectrum reuse, and collocation interference.

Each goodness factor is defined so that if the factor's fuzzy truth value for channel allocation plan X is greater than the factor's fuzzy truth value for channel allocation plan Y, that is if the goodness factor is "more true" for channel allocation plan X than for channel allocation plan Y, then channel allocation plan X will experience better communications than channel allocation plan Y. Consequently, the theoretical perfect channel allocation plan will have a goodness vector of all 1.0 values. An optimal channel allocation plan will have a goodness vector that is as close as possible to this theoretical perfect goodness.

4. Sort the channel allocation plans in the population in descending order of goodness vectors. For each goodness factor i, there is a rank $R_i$ and a weight $W_i$ where $1 \leq i \leq n$, where n is the number of goodness factors considered and each $R_i$ and $W_i$ is an integer greater than or equal to one. For each determination of an optimal channel allocation plan, the same ranks and weights may be used. The goodness vector for each plan may be rank and weight ordered to provide a single value which may be compared to vectors for other plans.

For example, consider two channel allocation plans A and B (this is expandable to the number of plans being considered.) Let $G_{iA}$ be the goodness value for goodness factor i in plan A, and $G_{iB}$ be the goodness value for goodness factor i in plan B. For all of the goodness factors i ranked in the highest ranking, let:

$$G_A = \sum_i W_i G_{iA}$$

$$G_B = \sum_i W_i G_{iB}$$

If $G_A > G_B$, then plan A is better than plan B, and vice versa. If $G_A = G_B$, repeat the comparison for the next rank.

In an alternative embodiment, albeit one not as robust as discussed above, the metric used to compare indicators may be the distance between two vectors GX and GY as measured n-dimensional space, where n is the number of goodness factors:

$$Distance(GX,GY) = \sum_{i=1}^{n} |GX_i - GY_i|$$

An optimal channel allocation (under this less robust method), then, has a indicator G for which the following quantity is minimized:

$$\sum_{i=1}^{n} |1 - G_i| = n - \sum_{i=1}^{n} G_i$$

After the channel allocation plans have been ranked, the better plans are nearer the beginning of the population of plans. The best channel allocation found so far is the first in the population.

5 From among the higher ranked of the $N_P$ channel allocation plans in the population, select two channel allocation plans at random for the purpose of manipulation in subsequent steps. A nonuniform probability distribution function may be used so that better channel allocation plans (those nearer the beginning of the population) are more likely to be selected than worse channel allocation plans (those nearer the end of the population).

The probability distribution function may be determined by three parameters;

$P_{SO}$- probability of selecting channel allocation plan 0 for manipulation.

$\Delta P_s$- amount by which probability of selecting plan for manipulation decreases for each subsequent plan, and $P_{Smin}$- minimum probability of selecting any channel allocation plan for manipulation.

If the channel allocation plans in the population are numbered 0 through $N_P$-1, the probability of selecting channel allocation plan i is proportional to:

$$Pr(i) \propto max(P_{SO} - i\Delta P_S, P_{Smin})$$

The true probability distribution function is this formula normalized to a sum of unity:

$$Pr(i) = \frac{max(P_{SO} - i\Delta P_S, P_{Smin})}{\sum_{i=1}^{N_P-1} max(P_{SO} - i\Delta P_S, P_{Smin})}$$

Figure 3:
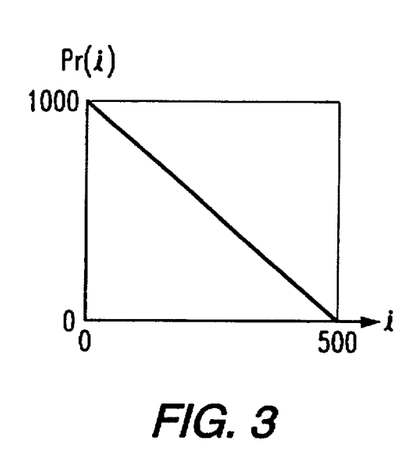
FIG. 3 is an exemplary probability distribution function which may be used in the present invention.

FIG. 3 is an example of the probability distribution function for $N_P$=500, $P_{SO}$=1.000, $\Delta P_S$=2, and $P_{Smin}$=0.

6. Select a manipulation method at random, either combination or mutation. The selection may be made by flipping a biased coin, where the probability of selecting a combination is $P_C$. Thus, the probability of selecting a mutation is $1-P_C$.

7. If the selected manipulation method is combination, then create a new channel allocation Z based on the two channel allocation plans X and Y selected at step 4. For each vector entry for network N and for each channel C, flip a fair coin and if the flip is heads, Z[N,C]← X[N,C], and if the flip is tails, Z[N,C]← Y[N,C]. For example, plan Z may be created from plans X and Y as follows, in which bold indicates a selection from plan Y:

| Ch. | 1 | 2 | 3 | 4 | 5 | 6 | 7 | 8 | 9 | 10 |
|-----|---|---|---|---|---|---|---|---|---|----|
|     |   |   |   |   | X |   |   |   |   |    |
| Net A | 0 | 0 | 1 | 0 | 1 | 1 | 0 | 0 | 0 | 0 |

-continued

| Ch.   | 1 | 2 | 3 | 4 | 5      | 6 | 7 | 8 | 9 | 10 |
|-------|---|---|---|---|--------|---|---|---|---|----|
| Net B | 1 | 0 | 0 | 0 | 1<br>Y | 0 | 0 | 1 | 0 | 1  |
| Net A | 0 | 1 | 1 | 1 | 1<br>Z | 1 | 1 | 1 | 1 | 1  |
| Net B | 0 | 0 | 0 | 0 | 0      | 1 | 0 | 1 | 1 | 0  |
| Net A | 0 | 0 | 1 | 1 | 1      | 1 | 0 | 1 | 1 | 0  |
| Net B | 0 | 0 | 0 | 0 | 1      | 0 | 0 | 1 | 0 | 1  |

8. If the selected manipulation method is mutation, then choose one of the two channel allocation plans selected at step 4 by flipping a fair coin. If the chosen channel allocation plan is X, create a new channel allocation plan Z based on X. For each vector entry for each network N and for each channel C, flip a biased coin, where the probability of heads is $P_M$. If the flip is heads, $Z[N,C] \leftarrow 1-X[N,C]$ (the element is inverted), and if the flip is tails, $Z[N,C] \leftarrow X[N,C]$ (the element is not inverted). For example, new plan Z may be created from plan X as follows, in which bold indicates which elements of X were inverted:

| Ch.   | 1 | 2 | 3 | 4 | 5      | 6 | 7 | 8 | 9 | 10 |
|-------|---|---|---|---|--------|---|---|---|---|----|
|       |   |   |   |   | X      |   |   |   |   |    |
| Net A | 0 | 0 | 1 | 0 | 1      | 1 | 0 | 0 | 0 | 0  |
| Net B | 1 | 0 | 0 | 0 | 1<br>Z | 0 | 0 | 1 | 0 | 1  |
| Net A | 0 | 0 | 1 | 1 | 1      | 1 | 0 | 0 | 0 | 0  |
| Net B | 1 | 0 | 0 | 0 | 1      | 0 | 0 | 1 | 0 | 0  |

A new channel allocation plan is thus formed by genetic manipulation of one or two existing channel allocation plans in the population. The new channel allocation plan's characteristics are a blend of the existing channel allocation plans' characteristics.

9. Add the new channel allocation plan to the end of the population, increasing the population size by one. Each channel allocation plan at any step may be assigned a serial number starting at 0.

10. Repeat steps 4 through 9 until the population size has increased to $N_P + \Delta N_P$. The newly created channel allocation plans do not yet participate in manipulation. The channel allocation plans selected for manipulation are still chosen from among the first $N_P$ channel allocation in the population.

11. Evaluate the new plans so that each plan has a goodness vector, and rerank the channel allocation plans in the population in descending order of goodness vector. Channel allocation plans with equal vectors may also be sorted into the order they were created.

At this point, the better channel allocation plans are nearer the beginning of the population. If some of the newly created channel allocation plans are better than some of the existing channel allocation plans, the newly created channel allocation plans have moved into positions among the first $N_P$ positions in the population, displacing other channel allocation plans. The best plan found so far, which might be one of the newly-created ones, is the first in the population.

12. Delete the last (i.e., the worst) $\Delta N_P$ channel allocation plans from the population, reducing the population size back down to $N_P$.

13. Repeat steps 4 through 12 until the first (i.e., the best) plan in the population has not changed for a sufficiently long period measured either in time or number of iterations. When the best plan and/or its goodness vector has not changed for the period, the population has converged on its final state and the top ranked plan is a reasonably optimal channel allocation plan.

In summary, better plans displace poorer plans in the population, and the goodness vector of the best channel allocation plan in the population gradually improves, as does the overall goodness of the entire population. When the vector and/or the best channel allocation plan in the population has not changed for a sufficiently long period, the process concludes that no further improvement is possible. By giving preferential treatment to the better channel allocation plans both for staying in the population ("survival of the fittest") and for manipulation to create new channel allocation plans ("reproduction of the fittest"), the process seeks out an optimal channel allocation plan without having to examine every possible channel allocation plan. While the process is not guaranteed to find the optimal channel allocation plan (no combinatorial optimization algorithm, other than an exhaustive search of every possible combination, can guarantee that), the process typically finds a channel allocation plan that is close to the optimal one.

Representative values for the parameters discussed above are shown below, although the invention is not so limited.

| Parameter Name | Typical Value | Description |
|---|---|---|
| $N_P$ | 500 | Number of channel allocation plans in the population, |
| $\Delta N_P$ | 25 | Amount by which the population size increases before the population is re-sorted and culled, |
| $P_I$ | Varies | Probability of assigning a channel to a network when generating a plan for the initial population, |
| $P_{SO}$ | 1,000 | Probability of selecting channel allocation plan 0 for manipulation, |
| $\Delta P_S$ | 2 | Amount by which probability of selecting plan for manipulation decreases for each subsequent plan, |
| $P_{Smin}$ | 0 | Minimum probability of selecting any plan for manipulation, |
| $P_C$ | 0.99 | Probability of selecting a combination as the manipulation method (probability of selecting a mutation = $1 - P_C$), |
| $P_M$ | 0.01 | Probability of inverting an element in the plan when performing a mutation, |
| $N_C$ | 20,000 | Convergence criterion; the population has converged to its final state when $N_C$ plans have been created with no change in the best plan. |

The present invention may use any set of goodness factors to find an optimal channel allocation plan, although in the present example, the selected factors obey these requirements:

(a) the goodness factor yields a single fuzzy truth value;

(b) a totally good channel allocation plan (from the standpoint of the factors being considered) yields fuzzy truth values of one;

(c) a better channel allocation plan (from the standpoint of the factor being considered) yields a higher fuzzy truth value than a worse channel allocation plan;

(d) a totally bad channel allocation plan (from the standpoint of the factor being considered) yields a fuzzy truth value of 0; and (e) channel allocation plans that differ in the goodness factors being considered yield different fuzzy truth values. (If two plans that differed in the factor being rated yielded the same fuzzy truth value, the process would not be able to sort those two plans into the proper order. An exception is that different plans that are all considered to be totally good should all yield a fuzzy truth value of 1.)

The sections below describe how to calculate these particular goodness factors: best-channels communication quality, average communication quality, channel count maximized, channel count minimized, frequency spread in range, frequency spread maximized, frequency spread uniformity, delay spread, inter-network spectrum reuse, and collocation interference. Other goodness factor can also be used without departing from the present invention.

Best-Channels Communication Quality Goodness Factor. The best-channels communication quality goodness factor for a channel allocation in a network N may be computed as follows, where Nc is the required minimum number of propagating channels.

For each hour H in the range 0 to 23, for each evaluation path P in network N,

If MQI is not to be considered, list for each allocated channel the channel's CQI at (H,P), If MQI is to be considered, list for each allocated channel the channel's CQI at (H,P) $\wedge$ the channel's MQI at indexes (H,P). (The fuzzy "and" operation, $\wedge$ is defined to be their minimum.)

sort the list of fuzzy quantities (the CQI and/or MQI values) into descending order, and calculate an average of the first Nc fuzzy quantities from the sorted list.

For each allocated channel C, for each evaluation path P in network N, if MQI is not to be considered, list for each hour H in the range 0 to 23 the channel C's CQI at indexes (H,P), if MQI is to be considered, list for each hour H in the range 0 to 23 the channel C's CQI at indexes (H,P) $\wedge$ channel C's MQI at indexes (H,P), find the largest fuzzy quantity in the list, and accumulate the chosen fuzzy quantity into the average calculated above.

The best-channels communication quality goodness factor is the average of all the accumulated fuzzy quantities. That is, in order for the best-channels communication quality goodness factor for a channel allocation in a network N to be perfect, every hour and path must have at least Nc perfect channels, and every channel and path must have at least one perfect hour. "Perfect" means a perfect CQI (if only communication quality is being considered) or a perfect CQI and a perfect MQI (if multipath quality is also being considered). To the extent that this criterion is not met, the goodness factor is less than perfect.

This goodness factor may be used to evaluate channel allocations for a network that will be used for automatic link establishment (ALE) communication. For ALE to work, there must be at least Nc well-propagating channels all the time, although different channels can be propagated at different hours of the day. Also, every channel should be usable at least some of the time; totally useless channels should not be allocated.

Average Communication Quality Goodness Factor. The average communication quality goodness factor for a channel allocation is a network N may be computed as follows.

For each hour H in the range 0 to 23, for each evaluation path P in network N, if MQI is not to be considered, calculate the average of all channels' CQI values at indexes (H,P), if MQI is to be considered, calculate the average of all channels' CQI value at indexes (H,P) $\wedge$ MQI value at indexes (H,P).

The average communication quality goodness factor is the average of all the accumulated fuzzy quantities. In order for the average communication quality goodness factor for a channel allocation in a network N to be perfect, every channel, hour, and path must have perfect propagation. "Perfect" means a perfect CQI (if only communication quality is being considered) or a perfect CQI and a perfect MQI (if multipath quality is also being considered). To the extent that this criterion is not met, the goodness factor is less than perfect.

This goodness factor may be used to evaluate channel allocations for a network that will be used for frequency hopping communication. For frequency hopping to work, all the allocated channels must have good propagation and low multipath probability all of the time. Channels that propagate poorly or that have a high multipath probability some or all of the time will prevent frequency hopping communication from occurring reliably.

Figure 4:
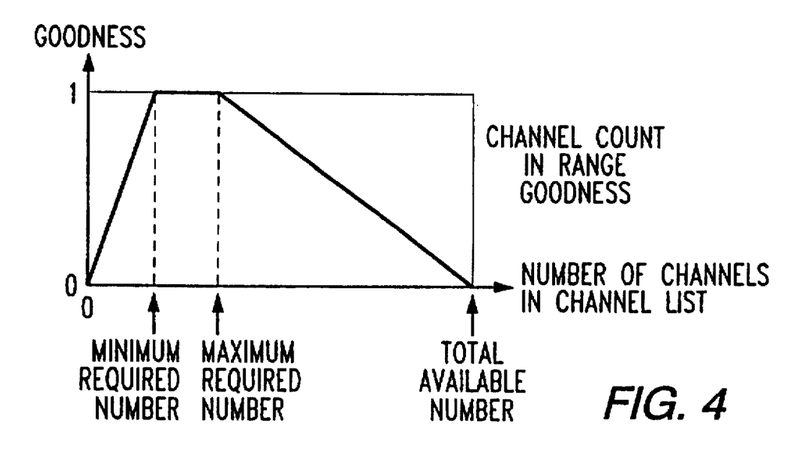
FIG. 4 is a graph depicting an embodiment of a relationship between communication goodness and channel count in range goodness factor.

Channel Count In Range Goodness Factor. The channel count in range goodness factor for a channel allocation in a network N may be computed using the fuzzy membership function depicted in FIG. 4, or other appropriate relationship. In order for the channel count in range goodness factor for a channel allocation in a network N to be perfect, the number of allocated channels must be greater than or equal to the minimum required number and less than or equal to the maximum required number for network N. To the extent that the number of allocated channels is less than the required minimum or greater than the required maximum, the goodness factor is less than perfect.

This goodness factor may be used to evaluate channel allocations for all networks, to ensure that the required number of channels are allocated to each net.

Figure 5:
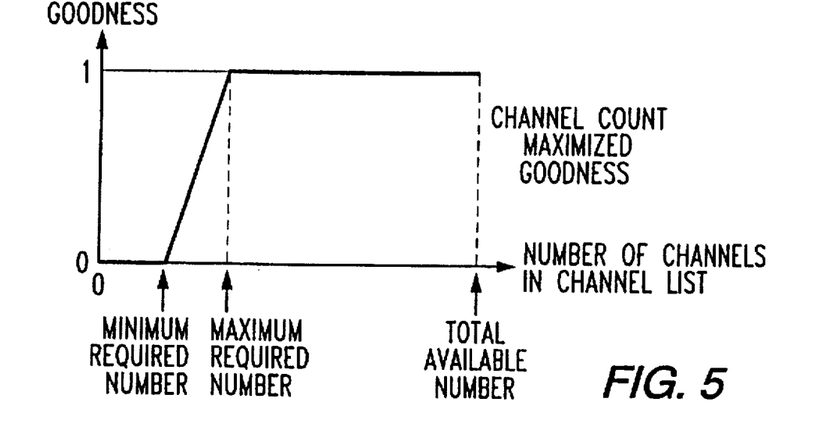
FIG. 5 is a graph depicting an embodiment of a relationship between communication goodness and channel count maximized goodness factor.

Channel Count Maximized Goodness Factor. The channel count maximized goodness factor for a channel allocation is a network N may be computed using the fuzzy membership function depicted in FIG. 5, or other appropriate relationship. In order for the channel count maximized goodness factor for a channel allocation in a network N to be perfect, the number of allocated channels must be equal to the maximum required number for network N. To the extent that the number of allocated channels is less than the required maximum, the goodness factor is less than perfect.

This goodness factor may be used to evaluate channel allocations for a network that will be used for frequency hopping communication. The more channels in the hopset, the more difficult it will be for an enemy to intercept or jam communications.

Figure 6:
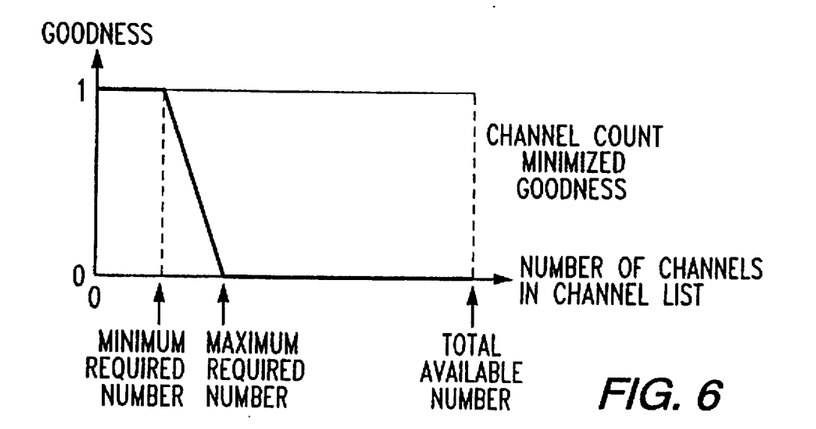
FIG. 6 is a graph depicting an embodiment of a relationship between communication goodness and channel count minimized goodness factor.

Channel Count Minimized Goodness Factor. The channel count minimized goodness factor for a channel allocation in a network N may be computed using the fuzzy membership function depicted in FIG. 6, or other appropriate relationship. In order for the channel count minimized goodness factor for a channel allocation in a network N to be perfect, the number of allocated channels must be equal to the minimum required number for network N. To the extent that the number of allocated channels is greater than the required minimum, the goodness factor is less than perfect.

This goodness factor may be used to evaluate channel allocations for a network that will be used for ALE communication. The fewer channels in the list the faster ALE calls can be set up and the faster ALE link quality can be measured.

Figure 7:
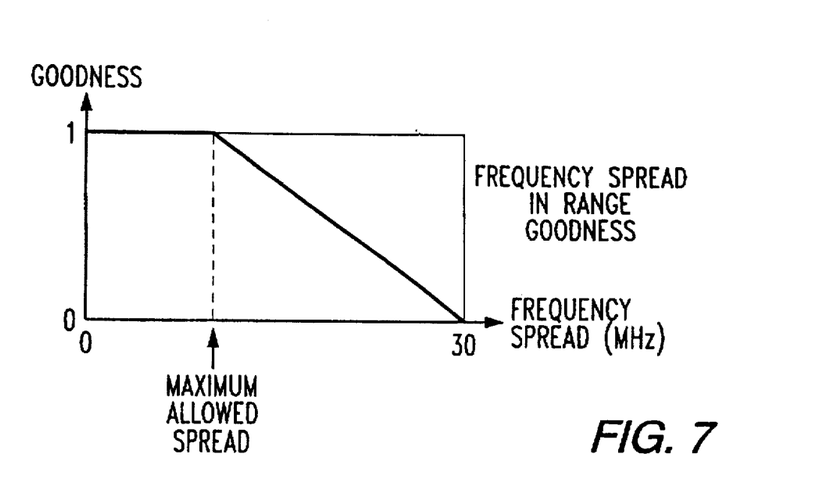
FIG. 7 is a graph depicting an embodiment of a relationship between communication goodness and frequency spread in range goodness factor.

Frequency Spread In Range Goodness Factor. The frequency spread in range goodness factor for a channel allocation in a network N may be computed using the fuzzy membership function depicted in FIG. 7, or other appropriate relationship, where the frequency spread is defined to be the difference between the highest frequency and the lowest frequency of all the channels in the list.

In order for the frequency spread in range goodness factor for a channel allocation in a network N to be perfect, the frequency spread must be less than or equal to the maximum allowed frequency spread (a characteristic of the radios). To the extent that the frequency spread is greater than the allowed maximum, the goodness factor is less than perfect.

This goodness factor may be used to evaluate channel allocations for a network that will be used for frequency hopping communication. If the difference between the frequencies of any two channels in the hopset is too large, then the radios will not be able to hop from one channel to the next fast enough, which will prevent frequency hopping communication from occurring reliably.

Figure 8:
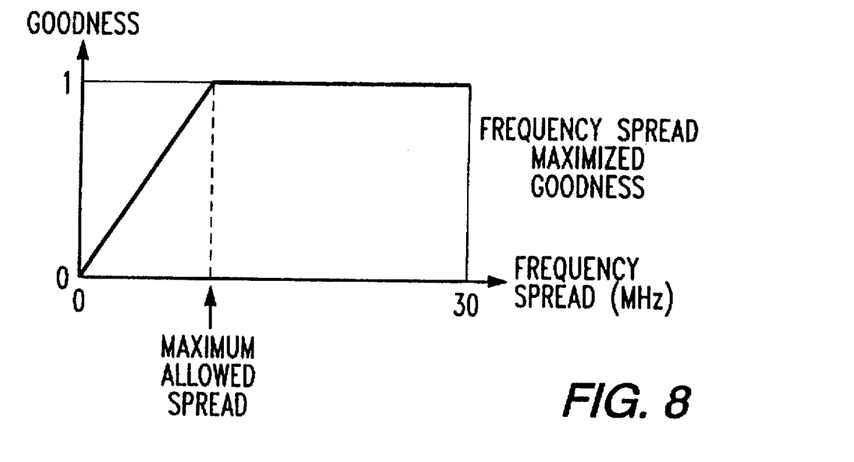
FIG. 8 is a graph depicting an embodiment of a relationship between communication goodness and frequency spread maximized goodness factor.

Frequency Spread Maximized Goodness Factor. The frequency spread maximized goodness factor for a channel allocation in a network N may be computed using the fuzzy membership function depicted in FIG. 8, or other appropriate relationship.

In order for the frequency spread maximized goodness factor for a channel allocation in a network N to be perfect, the frequency spread must be equal to the maximum allowed frequency spread (a characteristic of the radios). To the extent that the frequency spread is less than the allowed maximum, the goodness factor is less than perfect.

This goodness factor may be used to evaluate channel allocations for a network that will be used for frequency hopping communication. The larger the hopset's frequency spread, the more difficult it will be for an enemy to intercept or jam communications.

Frequency Spread Uniformity Goodness Factor. The frequency spread uniformity goodness factor for a channel allocation in a network N may be computed as follows. First, compute U, the frequency spread uniformity of a channel allocation, by sorting the allocated channels' frequencies into descending order, listing the differences between each sorted frequency and the next, and let U equal the mean absolute deviation of the frequency differences.

U achieves a value of 0 when all the allocated channels are spaced at exactly the same frequency intervals. The less uniform the frequency intervals, the larger U becomes.

Figure 9:
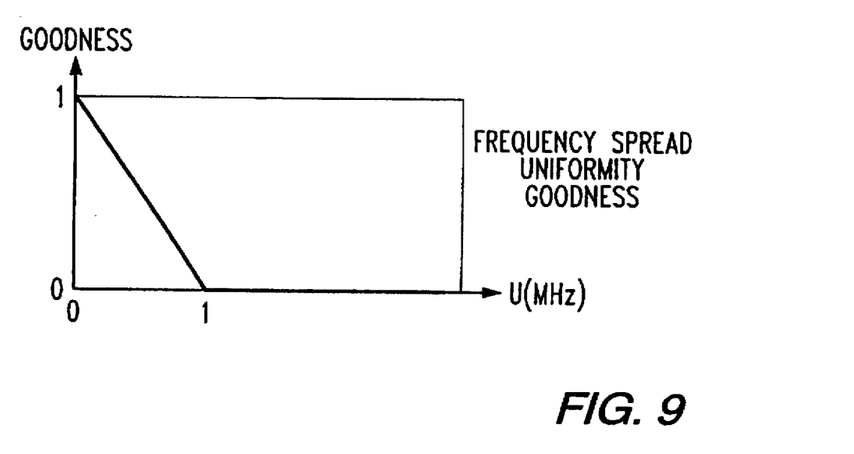
FIG. 9 is a graph depicting an embodiment of a relationship between communication goodness and frequency spread uniformity goodness factor.

Then compute the goodness using the fuzzy membership function depicted in FIG. 9, or other appropriate relationship.

In order for the frequency spread uniformity goodness factor for a channel allocation in a network N to be perfect, the channel frequencies must be exactly uniformly spaced. To the extent that the channel frequencies are not exactly uniformly spaced, the goodness factor is less than perfect.

This goodness factor may be used to evaluate channel allocations for a network that will be used for frequency hopping communication. The more uniformly spaced the hopset's frequencies, the more difficult it will be for an enemy to intercept or jam communications. Looking at it another way, if the hopset's frequencies are clumped together, it will be easier for an enemy to intercept or jam communications.

Delay Spread Goodness Factor. The delay spread goodness factor for a channel allocation in a network N may be computed as follows.

For each hour H in the range 0 to 23, for each evaluation path P, for each allocated channel C, compute the skywave propagation time for channel C at hour H and path P (using the skywave propagation prediction program), and compute the groundwave propagation time for channel C at hour H and path P (path distance divided by the speed of light).

Let the delay spread for hour H and path P equal the difference between the largest of the above propagation times and the smallest of the above propagation times for channel C.

Let the worst-case delay spread equal the largest delay spread among all hours and all paths.

Figure 10:
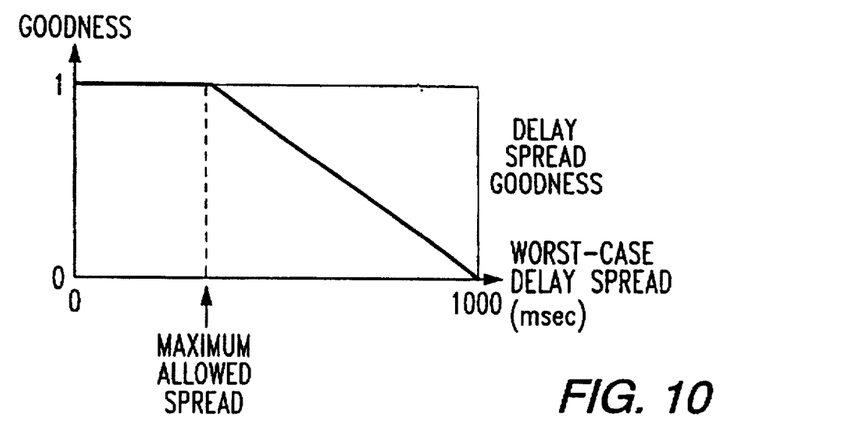
FIG. 10 is a graph depicting an embodiment of a relationship between communication goodness and delay spread goodness factor.

Compute the goodness using the fuzzy membership function depicted in FIG. 10, or other appropriate relationship.

In order for the delay spread goodness factor for a channel allocation in a network N to be perfect, the worst-case delay spread must be less than or equal to the maximum allowed delay spread (a characteristic of the radios). To the extent that the worst-case delay spread is greater than the allowed maximum, the goodness factor is less than perfect.

This goodness factor may be used to evaluate channel allocations for a network that will be used for frequency hopping communication. If the difference between the propagation times of any two channels in the hopset is too large, then the radios will not be able to remain in synchronism with each other as they hop from one channel to the next, which will prevent frequency hopping communication from occurring reliable.

Inter-Network Spectrum Reuse Goodness Factor. The inter-network spectrum reuse goodness factor for a network N may be computed as follows.

1. For every channel allocated to every net, compute the channel's occupied spectrum. A channel's occupied spectrum is the range of frequency in which power could be radiated when communication is occurring on the channel. This depends on the channel's carrier frequency, modulation mode, and bandwidth. For example, a channel with a carrier frequency of 2 MHz, modulation mode=upper sideband, and bandwidth=3 KHz will have an occupied spectrum of 2,000,300 to 2,003,300 Hz.

2. Compute the union of the occupied spectra of all of the channels allocated to network N.

3. Compute the union of the occupied spectra of the channels allocated to all nets other than network N.

4. Compute the intersection of the occupied spectrum for network N (from step 2) and the occupied spectrum for all nets other than N (from step 3). This is the reused spectrum for network N.

5. Compute network N's spectrum reuse fraction using, $$\text{Reuse fraction} = \frac{M(\text{reused spectrum for network } N \text{ from step 4})}{M(\text{occupied spectrum for network } N \text{ from step 2})}$$

The measure of a spectrum, MO is defined to be the sum of the widths of the frequency ranges in the spectrum.

Figure 11:
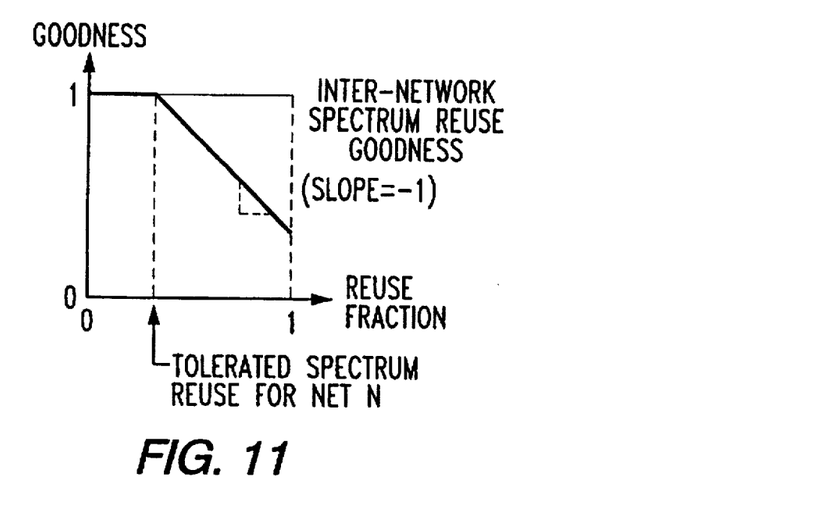
FIG. 11 is a graph depicting an embodiment of a relationship between communication goodness and internetwork spectrum reuse goodness factor.

6. Compute the inter-network spectrum reuse goodness factor using the fuzzy membership function depicted in FIG. 11, or other appropriate relationship.

In order for the inter-network spectrum reuse goodness factor for a network N to be perfect, the net's reuse fraction, which is the proportion of the net's channels that are also used in other nets, must be less than or equal to the net's tolerated spectrum reuse. To the extent that the net's reuse fraction is greater than the net's tolerated spectrum reuse, the goodness factor is less than perfect.

Collocation Interference Goodness Factor. The collocation interference goodness factor for a network N may be computed as follows.

Figure 12:
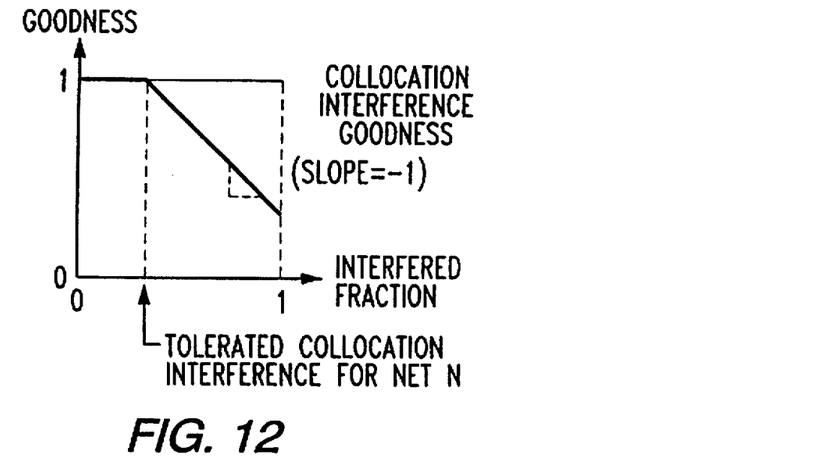
FIG. 12 is a graph depicting an embodiment of a relationship between communication goodness and collocation interference goodness factor.

1. For every channel allocated to every net, compute the channel's collocation interference spectrum. A channel's collocation interference spectrum consists of the ranges of frequencies that collocated radios should avoid using when communication is occurring on the channel. The collocation interface spectrum depends on the characteristics of the radios, the antennas, and the radio siting. For example, the rules might be to avoid using frequencies within±10% of a channel's fundamental frequency or within 15 KHz of a channel's second and third harmonic frequencies. In this example, a channel with a frequency of 2 MHz would have a collocation interference spectrum of 1,800,000–2,200,000 Hz, 3,985,000–4,015,000 Hz, 5,985,000–6,015,000 Hz.
2. Compute the union of the occupied spectra of the channels allocated to network N.
3. Compute the union of the collocation interference spectra of the channels allocated to all nets collocated with network N, other than network N itself.
4. Compute the intersection of the occupied spectrum for network N (from step 2) and the collocation interference spectrum for the collocated nets (from step 3). This is the interfered spectrum for network N.
5. Compute network N's interfered fraction using, $$\text{Interfered fraction} = \frac{M(\text{interfered spectrum for network } N \text{ from step 4})}{M(\text{occupied spectrum for network } N \text{ from step 2})}$$

6. Compute the collocation interference goodness factor using the fuzzy membership function depicted in FIG. 12, or other appropriate relationship.

In order for the collocation interference goodness factor for a network N to be perfect, the net's interfered fraction, which is the proportion of the net's channels that are interfered with by radios in collocated nets, must be less than or equal to the net's tolerated collocation interference. To the extent that the net's interfered fraction is greater than the net's tolerated collocation interference, the goodness factor is less than perfect.

As will be appreciated, the method of the present invention will find application in a variety of channelized resource allocation problems, in addition to radio channel allocation. Thus, while preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of planning allocation of channelized resources among networks of the resources, the method comprising the steps of:
   (a) generating plural plans for allocating the resources to the networks, each of the plural plans having a random allocation of the resources to the networks;
   (b) evaluating each of the plural plans to provide a vector for each of the plans which includes quality values on a scale which is continuous from best to worst; and
   (c) iteratively ranking the evaluated plans from best to worst based on the vector, and using higher ranked plans to generate further plans which are also ranked until the top ranked one of the plans does not change for a predetermined period.

2. The method of claim 1 wherein the step of generating further plural plans comprises the steps of selecting two of the plural plans using a distribution function which favors higher ranked plans, and forming a new plan by combining the selected two plans.

3. The method of claim 2 wherein the step of generating further plural plans comprises the steps of selecting one of the plural plans using a distribution function which favors higher ranked plans, and forming a new plan by mutating the selected plan.

4. The method of claim 1 wherein the step of ranking the plans comprises the steps of weighting the vector values and summing the weighted values to provide a numerical value for ranking the plural plans.

5. The method of claim 4 wherein the step of ranking the plans comprises the steps of assigning relative ranks to the vector values and wherein the weighted vector values which are summed are of the same relative rank.

6. The method of claim 1 wherein the predetermined period is determined by either a passage of time or number of further plural plans which have been added.

7. The method of claim 1 wherein the step of iteratively ranking further comprises the step of deleting lower ranked ones of the plans.

8. A method of allocating radio channels among networks of radio transceivers where the number of possible allocation plans is vast, the method comprising the steps of:
   (a) generating plural plans for allocating the radio channels to the networks, each of the plural plans having a random allocation of the radio channels to the networks;
   (b) evaluating each of the plural plans to provide a goodness vector for each of the plans;
   (c) ranking the evaluated plans from best to worst based on the goodness vector;
   (d) adding further plural plans which are revisions of higher ranked ones of the plural plans until a predetermined number of further plural plans have been added;
   (e) performing steps (b) and (c) and deleting lower ranked ones of the plural plans;
   (f) repeating steps (d)–(e) until one of (i) the top ranked one of the plans and (ii) the goodness vector of the top ranked one of the plans does not change for a predetermined period; and
   (g) allocating the radio channels in accordance with the top ranked one of the plans.

9. The method of claim 8 wherein the goodness vector comprises values on a scale which is continuous between best and worst.

10. The method of claim 8 wherein the predetermined period is determined by either a passage of time or number of further plural plans which have been added.

11. The method of claim 8 wherein the step of evaluating the plural plans comprises the step of considering at least one of following goodness factors: best-channels communication quality, average communication quality, channel count maximized, channel count minimized, frequency spread in range, frequency spread maximized, frequency spread uniformity, delay spread, inter-network spectrum reuse, and collocation interference.

12. The method of claim 11 further comprising the step of measuring the goodness factors on a scale which is continuous from best to worst.

13. The method of claim 8 wherein the step of adding further plural plans comprises the steps of selecting two of the plural plans using a distribution function which favors higher ranked plans, and forming a new plan by combining the selected two plans.

14. The method of claim 8 wherein the step of adding further plural plans comprises the steps of selecting one of the plural plans using a distribution function which favors higher ranked plans, and forming a new plan by mutating the selected plan.

15. The method of claim 8 wherein the step of evaluating the plural plans comprises the step of predicting the effect of skywave and groundwave propagation on reliability over time of day.

16. The method of claim 8 wherein the step of evaluating the plural plans comprises the step of predicting the probability of multipath propagation over time of day.

17. The method of claim 8 wherein each of the networks has a desired number of channels and wherein the step of evaluating the plural plans comprises the step of comparing the number of channels allocated under each of the plural plans to the desired number of channels.

18. The method of claim 8 wherein the step of evaluating the plural plans comprises the steps of determining an average communication quality over time for each of the plural plans and comparing the determined averages.

19. The method of claim 8 wherein each of the networks has a desired frequency spread and wherein the step of evaluating the plural plans comprises the step of comparing the frequency spread under each of the plural plans to the desired frequency spread.

20. The method of claim 8 wherein each of the networks has a desired delay spread and wherein the step of evaluating the plural plans comprises the step of comparing the delay spread under each of the plural plans to the desired delay spread.

21. The method of claim 8 wherein there is a maximum desired amount of inter-network frequency spectrum reuse and wherein the step of evaluating the plural plans comprises the step of comparing the amount of inter-network frequency spectrum reuse under each of the plural plans to the maximum desired amount of inter-network frequency spectrum reuse.

22. The method of claim 8 wherein there is a maximum desired amount of frequency spectrum collocation interference and wherein the step of evaluating the plural plans comprises the step of comparing the amount of frequency spectrum collocation interference under each of the plural plans to the maximum desired amount of frequency spectrum collocation interference.

23. The method of claim 8 wherein the step of ranking the plans comprises the steps of weighting goodness vector values and summing the weighted values to provide a numerical value for ranking the plural plans.

24. The method of claim 23 wherein the step of ranking the plans comprises the steps of assigning relative ranks to goodness vector values and wherein the weighted goodness vector values which are summed are of the same relative rank.

* * * * *